United States Patent [19]

Griffith et al.

[11] Patent Number: 4,825,050

[45] Date of Patent: Apr. 25, 1989

[54] SECURITY TRANSACTION SYSTEM FOR FINANCIAL DATA

[75] Inventors: John B. Griffith, Plantation; Donald F. Linton, Pompano Beach, both of Fla.

[73] Assignee: Transaction Security Corporation, Delray Beach, Fla.

[21] Appl. No.: 531,673

[22] Filed: Sep. 13, 1983

[51] Int. Cl.[4] .................... G06F 15/30

[52] U.S. Cl. .................... 235/379; 380/29; 380/45; 902/2

[58] Field of Search .................... 235/379, 380; 178/22.08, 22.1, 22.11; 380/29, 45; 902/2

[56] References Cited

U.S. PATENT DOCUMENTS

| | | | |
|---|---|---|---|
| 4,023,012 | 5/1977 | Ano et al. | 235/379 |
| 4,198,619 | 4/1980 | Atalla | 235/380 X |
| 4,304,990 | 12/1981 | Atalla . | |
| 4,306,111 | 12/1981 | Lu et al. | 178/22.11 X |
| 4,315,101 | 2/1982 | Atalla . | |
| 4,328,414 | 5/1982 | Atalla . | |
| 4,405,829 | 9/1983 | Rivest et al. . | |
| 4,438,824 | 3/1984 | Mueller-Schloer | 380/29 X |
| 4,503,287 | 3/1985 | Morris et al. | 380/45 |
| 4,578,530 | 3/1986 | Zeidler | 380/29 X |

*Primary Examiner*—David L. Trafton

*Attorney, Agent, or Firm*—Malin, Haley & McHale

[57] ABSTRACT

A system for a data protection executing financial transactions employing cryptographic techniques. The system comprises an encoded card, which has been initially encrypted using the National Bureau of Standards Data Encryption Standard Algorithm. A subsequent encryption utilizes a private key of a public key cryptosystem is completed resulting in an account number and an uncoded identifier which are placed on the card. The encoded card may be placed in a sender unit which decrypts the public key. The user that enters a personal identifier in the sender unit. The data is transferred to a receiving unit that decrypts the transmitted data utilizing the private key which is unknown to both the user and the sender unit.

4 Claims, 6 Drawing Sheets

STAGE 3

STAGE 1

SECURITY TRANSACTION SYSTEM FOR FINANCIAL DATA

BACKGROUND OF THE INVENTION

Multilevel encoding methods utilizing encoding cards are presently being employed for transmission of financial data. U.S. Pat. No. 4,328,414 shows a card which is unique to the individual based on an individual secret identifying code 11 in combination with additional numbers which are encrypted. After verifying the encoded card the user institution may encrypt the data for private security and control at the banking institution. The encoded card may be used in combination with the individuals personal identifier number 11, at the line of transaction, the account number 13, the bank I.D. 15, and the bank secret key 21. The above described patent requires the implantation of a secret unique identifier as an integral part of the security system.

The present invention provides a transaction system employing a locking and unlocking system which employs a public key to generate a digital signature, a sender unit which decrypts a portion of the encoded card and user identifier number and a receiver unit that decrypts the private key of the public key. The present invention provides a system wherein the decryption of the transmitted data statistically cannot be computated with knowledge of the encoded card and/or of the sender unit algorithm. The present invention provides a means for preventing credit card fraud in at least two major categories, use of invalid cards which have been invalidated by the receiver unit and invalid transactions generated by using the sender unit.

SUMMARY OF THE INVENTION

The prior art in the area of financial data transmission requires an element of the transaction system be maintained in secrecy. The security of the entire transaction system depends on maintaining the secrecy of that element of the transaction system. The present invention is a system wherein the combination of events provides a statistically secure transaction system. The present invention is an initially encrypted encoded card which, in combination with a sender unit utilizing a private key and individual identifier, provides a subsequently encrypted financial data which is transmitted to the receiver unit. The receiver unit employs a public key to decrypt the transmitted financial data. The encryption-decryption methods developed by Rivest, Sham and Adleman (RSA method) provide a basis for the public key cryptosystem.

It is an object of this invention to provide a statistically secure system for the transmission of financial data.

It is a further object of this invention to provide a statistically secure system that "locks" or encrypts the financial data to be transmitted by multiple encryption of information.

It is still another object of this invention to "unlock" or decrypts the received financial data utilizing a public key and the personal identifier.

It is another object of this invention that the "locking and unlocking", or encrypting and decrypting, respectively, provide a method to distribute, transmit an individual information security key.

It is a further object of this invention to generate a digital signature for a transaction.

DESCRIPTION OF THE PREFERRED EMBODIMENT

The term "lock" and encrypt are interchangeable. The term "unlock" and decrypt are interchangeable.

Figure 1:
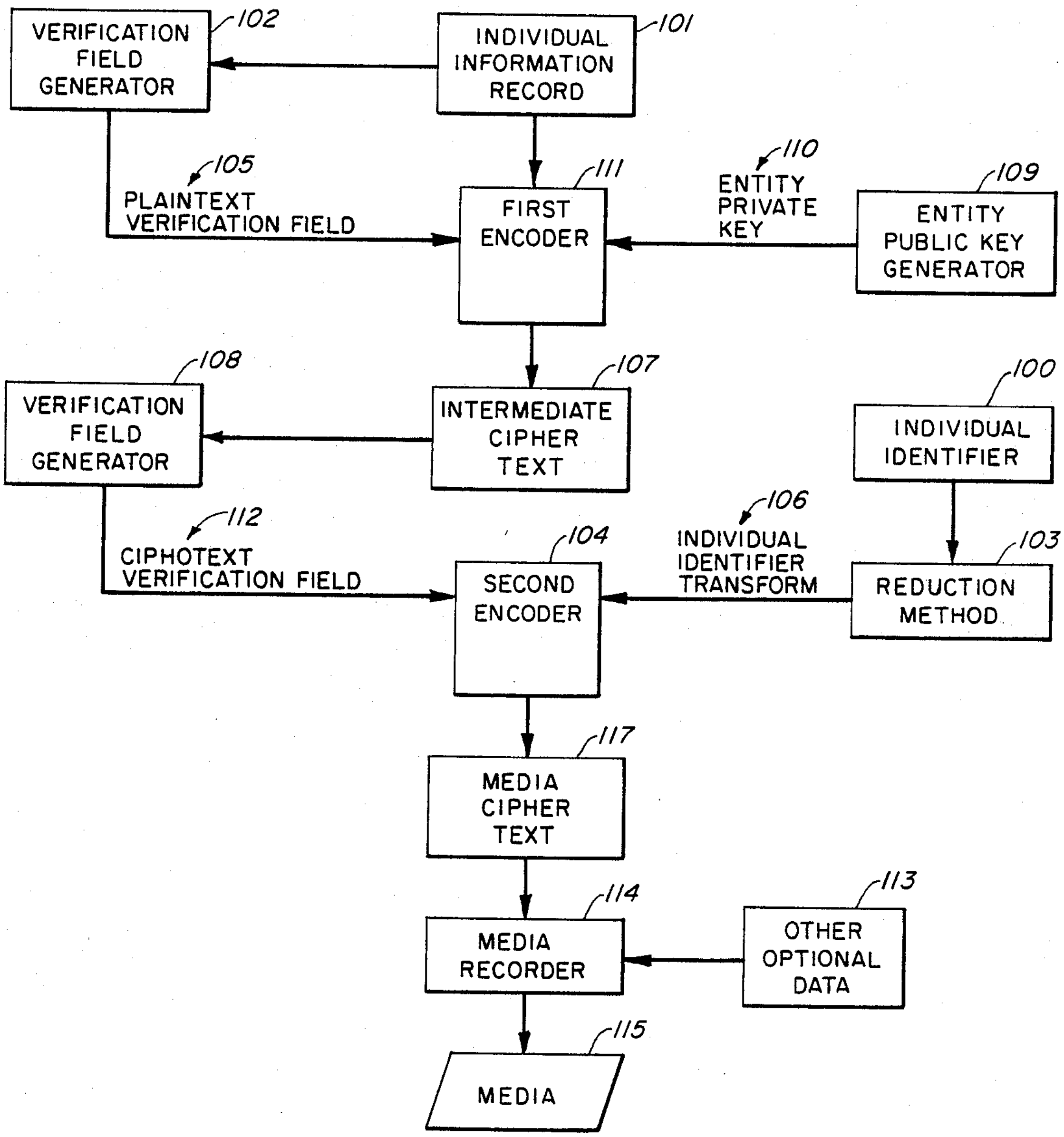
FIG. 1 is a flow chart of the locking method.

Referring now to FIG. 1, there is shown an flow diagram of the media "locking" method employed in the present invention. This method may be used to "lock" information 101 recorded or stored on some individualized media 115, e.g. the magnetic stripe of a credit card. When information is "locked" in this manner it may be "unlocked" only by the individual possessing the individual identifier 100. Further counterfeit or altered media can be detected. Multiple inputs are accepted in the following manner: The individual information record 101 which is the data to be "locked"; the individual identifier 100 which may be some characteristic of the individual e.g. finger, voice, or retinal pattern, signature, or chemical structure or some information known only to the individual, e.g. a combination, pass word or phrase; a private key 110 which is known only to the issuing entity and which is generated by any method 109 meeting the criteria for public key cryptosystems outlined by W. Diffie and M.E. Hellman in their article cited above such as the system publicly disclosed by Rivest, Shamir, and Adleman ob cit; and optionally other data 113 which is necessary or convenient to include regarding the application made of the present method. The individual identifier 100 presented may be mapped into a key space appropriate to the encoding method 104 using a reduction method 103 such as summation modulo the key space size yielding the individual identifier transform 106. The individual information record 101 may be passed to a verification field generator 102 such as a check sum or parity mechanism to produce the plaintext verification field 105. The individual information record 101 may be combined with the plaintext verification field 105, if present, and using the entity private key 110 is encoded by the first encoder 111, which employs any public key cryptosystem as above cited, to yield the intermediate ciphertext 107. The intermediate cipher text 107 may be passed to a verification field generator 108 which may be a reuse or duplication of generator 102 or may employ a different technique, to generate the ciphertext verification field 112. The intermediate ciphertext 107 is combined with said ciphertext verification field 112, if present, and using the individual identifier transform 106 as the key, is encoded by the second encoder 104 to yield the media cipher text 117. Said encoder 104 may be a conventional NBS data encryption module or other private key technique accepting a key and encoding information thereby. Said media ciphertext 117 and other data 113, such as account number or bank identification number, may be stored or recorded on the media 115, by media recorder, 114, using any technique of mechanical, electronic, magnetic, or optical recording or storage which is appropriate for the media 115. Said media recorder, 114, may employ an error correcting and/or detecting recording method when appropriate.

Figure 2:
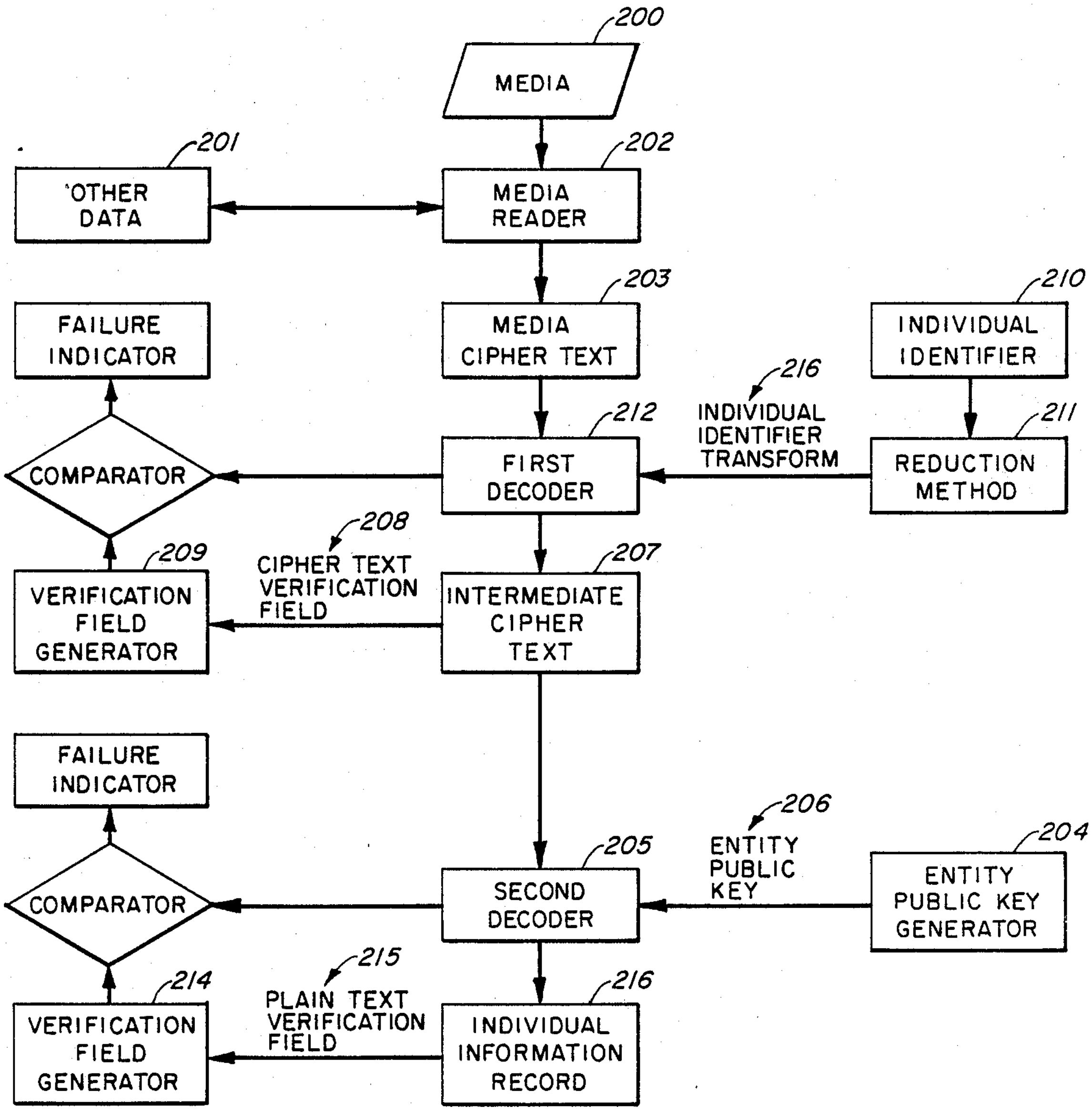
FIG. 2 is a flow chart of the unlocking method.

Referring now to FIG. 2 there is shown a flow diagram of the media "unlocking" method employed in the present invention. This method is used to "unlock" the individual information record 216 stored on media 200 in accordance with the "locking" method of FIG. 1. The method provides indications if the media was not "locked" by an entity possessing the private key corresponding to the entity public key 206 or if the individual identifier 210 is not the same as that used to "lock" the media 200, e.g. the media was counterfeited or was being used fraudulently. Multiple inputs are required: Some media 200 stored or recorded in accordance with the method of FIG. 1; the entity public key 206 corresponding to the entity private key 110 of FIG. 1 as outlined in the public key crytography references op cit; and the individual identifier 210 used in FIG. 1 at 100 and again entered or detected for use by this method. Multiple outputs are produced: If other ancillary information 201 has been stored or recorded at 113 of FIG. 1 it may be delivered; the individual information record 216, which is the data being "unlocked"; and an indication of the success or failure of the "unlocking" process. the media 200 may be read by the media reader 202 which may employ an error detecting and/or correcting method, if such was employed when the media was recorded, to deliver the media ciphertext 203 and if such was included when the media was recorded, the other information 201. The individual identifier 210 may be mapped into the key space appropriate to the first decoder 212 by the reduction method 211 yielding the individual identifier transform 216. The media ciphertext 203 may be decoded using the individual identifier transform 216 as the key by first decoder 212 which employs a private key technique as at 104 of FIG. 1 to yield the intermediate ciphertext 207 and, if included during the "locking" process, the ciphertext verification field 208. If said field 208 is included it may be verified by sending the said field 208 and the intermediate ciphertext 207 to the verification check 209. In said verification check 209, a new ciphertext verification field value is generated using the present intermediate ciphertext 207 in accordance with the checking method employed by the verification field generator 108 of FIG. 1. The new value is compared with the ciphertext verification field 208. If there is relative equality, the "unlocking" process continues, otherwise a failure indication is raised and the process terminates. Using the entity public key 206 produced by the entity key generator 204 according to the method ob cit, the intermediate ciphertext 207 is decoded by the second decoder 205, which is compatible with the method employed in 104 of FIG. 1 to yield the individual information record 216 and, if included during the "locking" process, the plaintext verification field 215. If said field 215 is included it may be verified by sending the said field 215 and the individual information record 216 to the verification checker 214. In said checker, 214, a new plaintext verification field value is generated using the present individual information record 216 in accordance with the checking method employed by the verification field generator 102 of FIG. 1. The new value, is compared with the plaintext verification field 215. If there is relative equality, the "unlocking" process continues, otherwise a failure indication is raised and the process terminates.

Figure 3A:
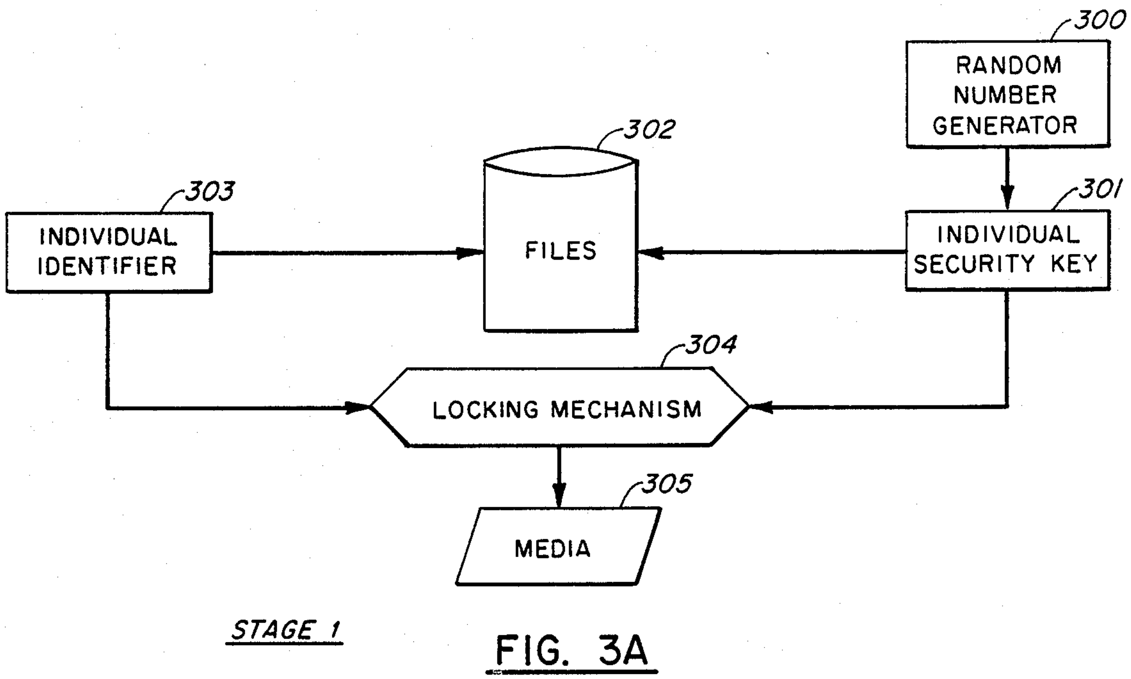
FIG. 3A is a flow chart of the transaction security method in stage one.
Figure 3B:
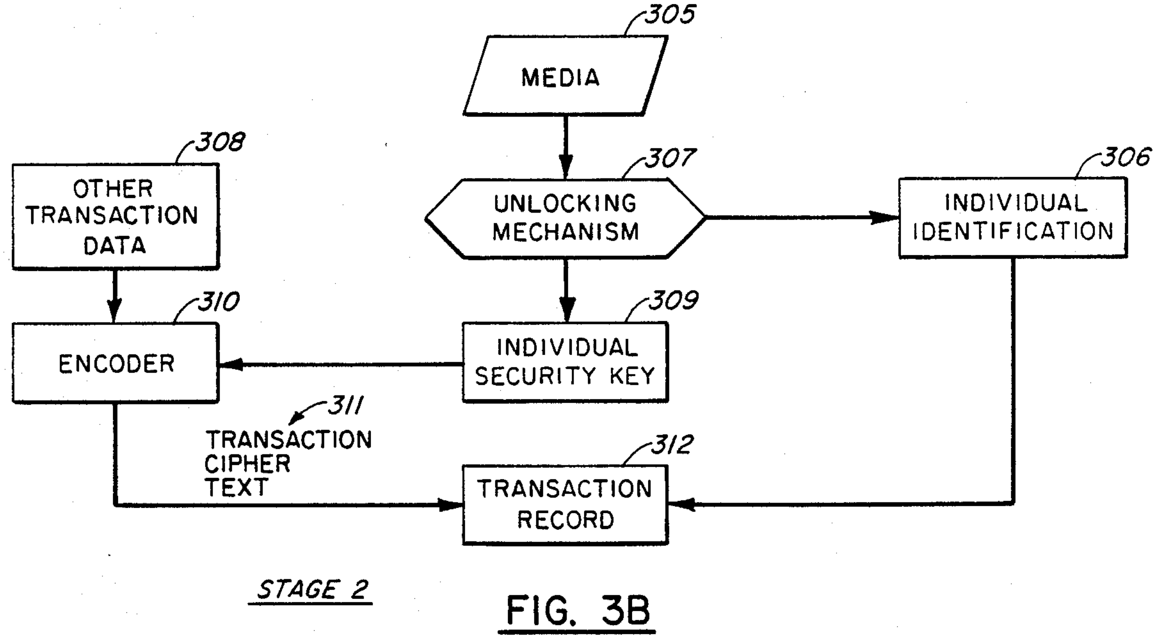
FIG. 3B is a flow chart of the transaction security method in stage two.
Figure 3C:
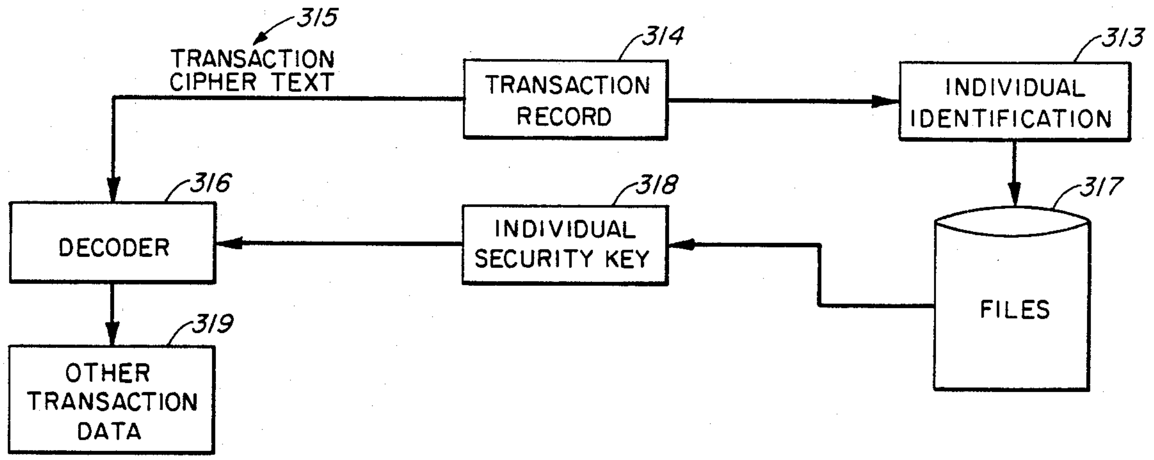
FIG. 3C is a flow chart of the transaction security method in stage three.

Referring now to FIG. 3 there is shown a flow diagram of the transaction security method of the present invention. The method involves three stages: Stage 1 wherein the individual security key 301 is generated and "locked", using the method of FIG. 1, onto the media 305; stage 2 wherein the individual security key 309 is "unlocked" using the method of FIG. 2, from the media 305 and combined with other data to produce the encoded transaction record 312; and stage 3 wherein the transaction record 314 is decoded. In stage 1, which is performed before the media 305 is issued by the entity to an individual, the random number generator 300 is used to produce a random individual security key 301 of appropriate size and nature for use by encoder 310 and decoder 316. Said key, 301, is paired with the individual identification 303. The pair is recorded in suitable form in the files 302 of the issuing entity and, using the locking method of FIG. 1 and the required locking keys, records or stores said paired elements in locked representation upon media 305. In stage 2, which is performed when the media is presented to validate a transaction, the media 305 is unlocked by unlocking mechanism 307, which employs the method of FIG. 2, using the unlocking keys required to yield the individual security key 309 and individual identification 306 pair. Any other data 308 relevant to the transaction may be encoded by encoder 310, which may be a conventional NBS data encryption module or other technique accepting a key and encoding information to yield a transaction ciphertext 311. The ciphertext 311 may be combined with the individual identification 306 to yield the transaction record 312. The record 312 may be transmitted, e.g. electronically, immediately or after some delay to the entity. Stage 3, which is performed by the issuing entity after the transaction record 314 is received, the individual identification 313 from said record 314 is used to search the issuing entity's files 317. If said identification 313 cannot be found in files 317 then an error indication will be given. If said identification 313 is found in files 312, then the individual security key 318 paired with said identification 313 in files 317 is used by decoder 316. The decoder 316 employs a method compatible with that of encoder 310, as the key to decode the transaction ciphertext 315 which was included in the transaction record 314 to yield the relevant transaction data 319.

Figure 4A:
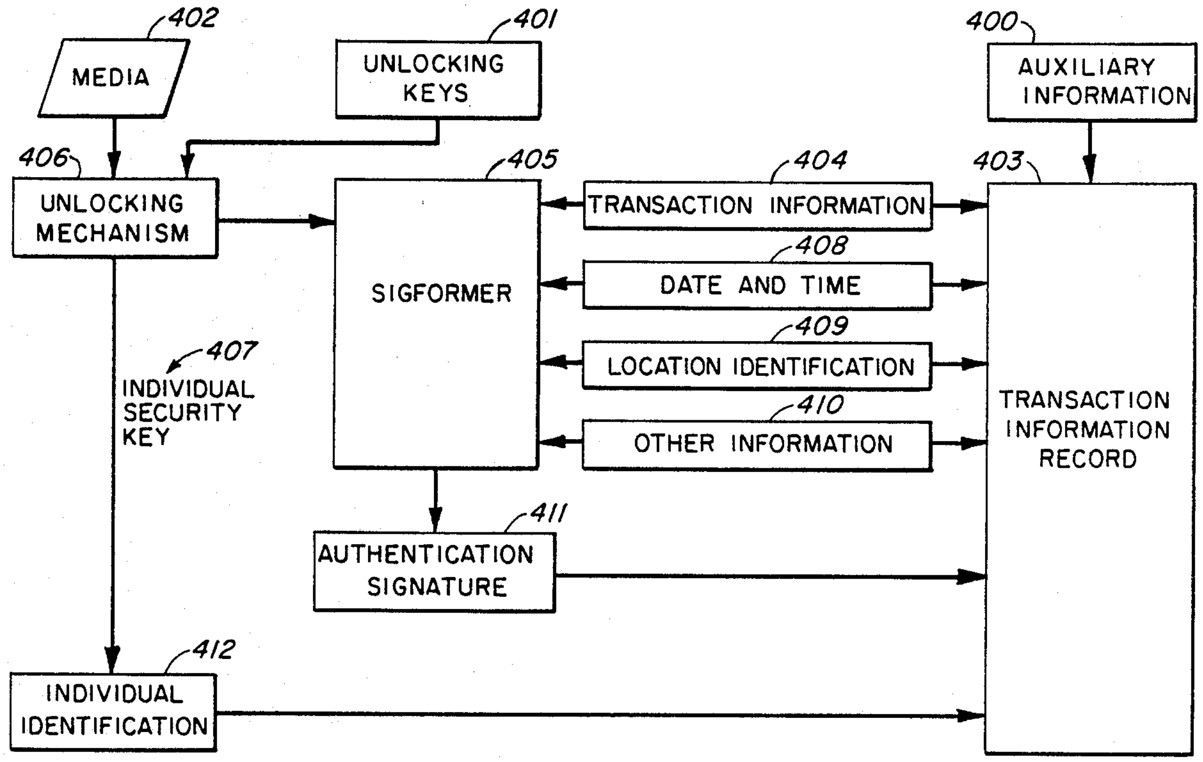
FIG. 4A is a flow chart of the authentication code generation and checking method in stage one.
Figure 4B:
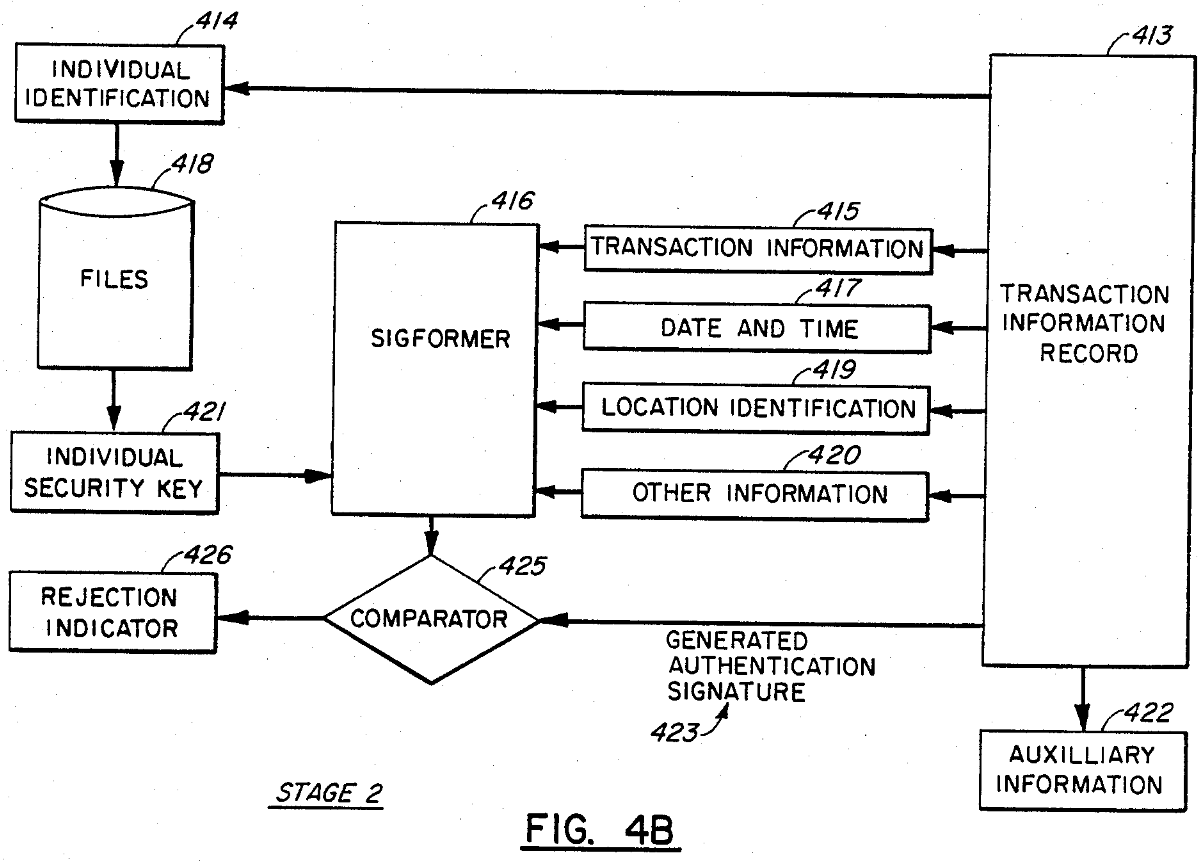
FIG. 4B is a flow chart of the authentication code generation and checking method in stage two.

Referring now to FIG. 4 there is shown flow diagram of the authentication code generation and checking method of the present invention. This method is employed to add to the transaction information set 404, 408, 409 and 410 a unique and verifiable authentication signature 411 and to verify such signatures when said information set 404, 408, 409 and 410 and signature reach the destination entity. The method involves two stages: In the first stage, which may be employed at the transaction point, the media 402, which has been secured in accordance with the method of FIG. 3, is "unlocked" via the unlocking mechanism 406 which employs the method of FIG. 2, using the unlocking keys 401 required to yield the individual identification 412 and the individual security key 407. Multiple inputs such as the location identification 409, the date and time representation or serial number 408, relevant transaction information 404, and/or other data 410 necessary or convenient to include may be accepted by the sigformation module 405 which also may accept the individual security key 407 to yield the authentication signature 411. The sigformation module 405 may employ any appropriate method which will combine multiple inputs and the key 407 to produce a code of the desired size and nature, e.g. summation modulo the desired size. The authentication signature 411, the inputs 404, 408, 409 and 410, and other auxiliary data 400 may be combined to yield the transaction information record 403. In stage two which is performed by the entity upon receipt of the transaction information record 413, the record 413 is separated into the elements from which it was assembled: The location identification 419; the date and time representation or serial number 417; the relevant transaction information 415; the auxiliary information 422, if included; other relevant data 420, if used; the generated authentication signature 423; and, the individual identification 414. The identification 414 is used to search the entity files 418 which were generated in stage 1 of the security method of FIG. 3 for the individual security key 421 paired with identification 414 for storage in files 317. If identification 414 is not found in files 317 a refusal indication is given and the process terminates, otherwise the key 407 and multiple inputs 415, 417, 419 and 420 are employed by the sigformation module 416 to duplicate the authentication signature generation step of stage 1 to yield the new authentication signature 424. This new authentication signature 424 and the purported authentication signature 423 are evaluated by comparator 425 for relative equality. If there is parity between signature 424 and signature 423 an acceptable indication____, is given, otherwise a refusal indication 426 is produced.

Figure 5A:
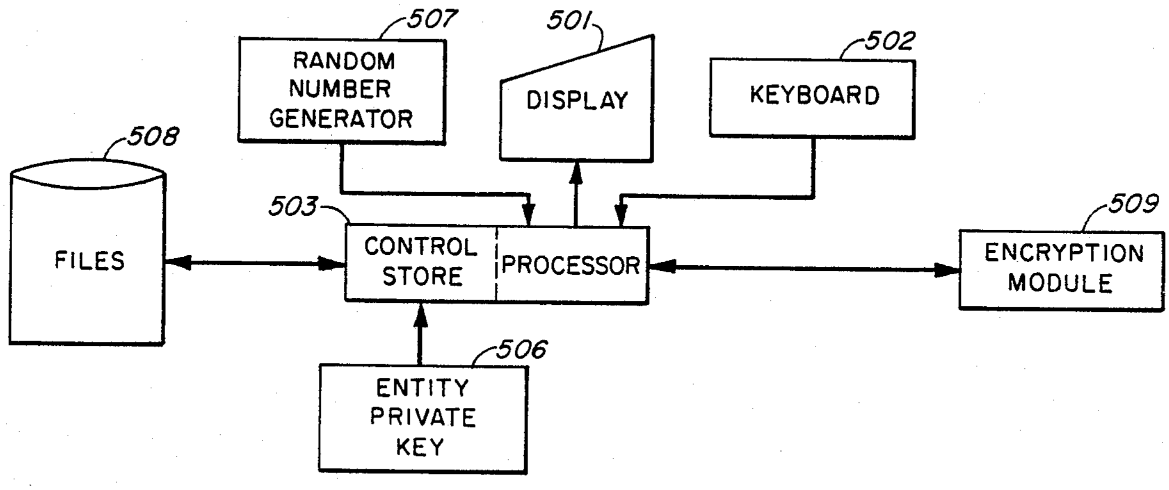
FIG. 5A is a block diagram of the main unit of the media generating apparatus.
Figure 5B:
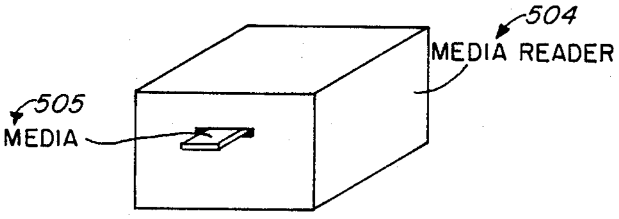
FIG. 5B is a block diagram of the on sight media generating apparatus.

Referring now to FIG. 5 there is shown a block diagram of the media generation apparatus of the present invention for operation according to FIG. 1 which may also implement the transaction security method of FIG. 3 and/or authentication code generation method of FIG. 4. At the time the media 505 is to be issued, an agent of the issuing entity enters, via the keyboard, 502, the individual identification 210 as shown in FIG. 1, and other optional data as desired. The user then enters his personal identifier via said keyboard. The mechanisms for processor 503 to accept such inputs and the means for interconnecting are well known. Processor 503 using a reduction method as described above transforms the individual identifier 210 as shown in FIG. 1 into a value appropriate as a key for encryption module 509. The processor 503 inputs a random individual security key from the random number generator 507 which may be a data bus connected free running source of random or pseudo-random numbers such as any circuit implementing the method described in Knuth ob cit. The individual security key, the transformation, the individual identification, 210 as shown in FIG. 1, and other data are sent to encryption module 509 which may include an integrated circuit implentation of the NBS data-encryption standard available from Motorola, Inc. data bus connected to processor 503. The encryption module 509 returns to the processor 503 the intermediate cipher text 107. The processor 503 then reads the entity private key 506 from a source such as a read-only memory. The key 506 and the cipher text 107 are combined using a public key method such as above described by processor 503 to produce the media cipher text 117 as shown in FIG. 1. The entity agent is then prompted via display 501 to insert the media 505 into media recorder 504. Processor 503 then controls the recorder 504 to write the media cipher text 117 on the media 505. The processor 503 then causes the individual identification 210 as shown in FIG. 1 and the individual security key to be stored in the issuing entity's files 508 by some means such as a bus connected disk controller or a communications link. In this way the media 505 has been generated to provide proof against counterfeiting and such that only the individual identifier 210 as shown in FIG. 1 will allow access to the above entered information.

Figure 6:
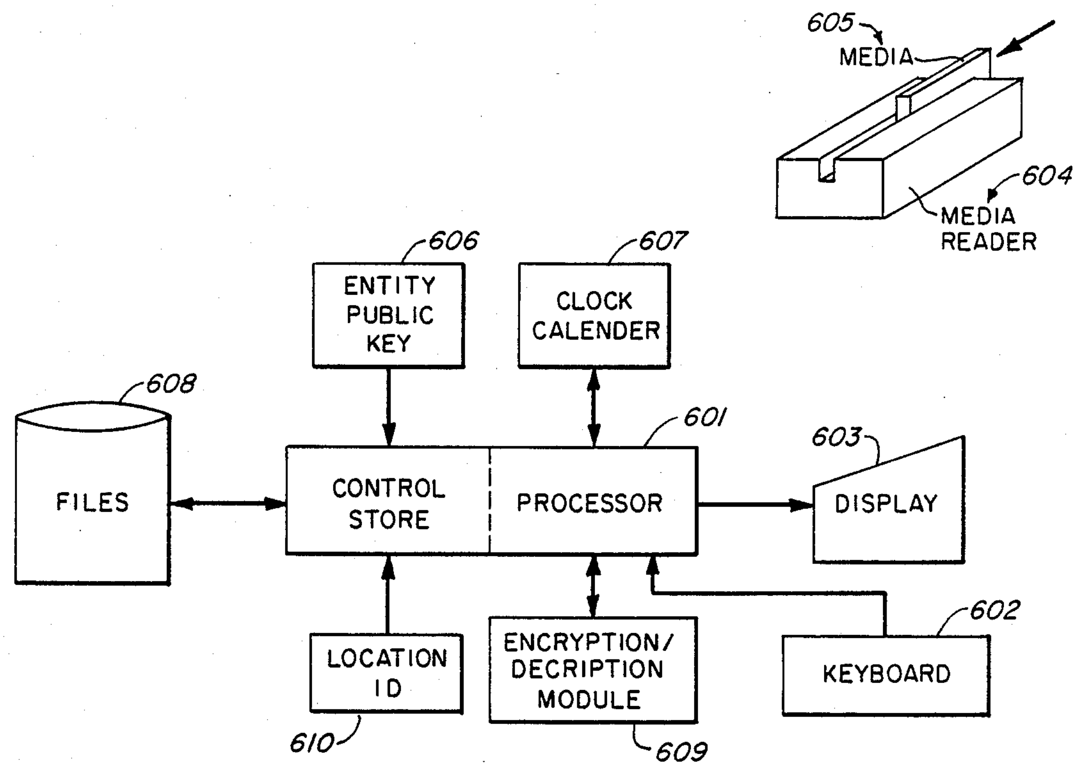
FIG. 6 is a block diagram of the transaction part apparatus.

Referring now to FIG. 6 there is shown a block diagram of the transaction point apparatus for operation according to FIG. 2 which may also implement the transaction security method of FIG. 3 and/or the authentication code generation method of FIG. 4. At the time the media 605 is presented to execute a transaction, the media 605 is read by media reader 604 and the previously recorded media cipher text 117 is input by the processor 601 using or interconnection process known to the art. The individual transactor is prompted via display 603 to enter this personal identifier via keyboard 602. The identifier is input using any conventional means by processor 601 and using the above described method is transformed into a value appropriate as a key for encryption module 609. The key and cipher text 117 are sent to the encryption module 609 such as described above which operates at this time in decryption mode. The module 609 returns the intermediate cipher text 207. The processor 601 then reads the entity public key 606 from some source such as read-only memory. The key 606 and the cipher text 117 are combined by processor 601 using a public key method as above described to produce the individual identification, individual security key, and other data entered at media generation by the apparatus of FIG. 5. The processor 601 then prompts via display 603 the entry of relevant information concerning the transaction via keyboard 602. The transaction information is input by processor 601 as described above and inserted into the transaction information record. The current date and time are input from the clock calendar module 607 which may include any of the commercially available time and date integrated circuits coupled by conventional means and inserted in the transaction information record. The location identification 610 which may reside in read-only memory is added to the transaction information record. The elements of the transaction information record are combined using any known digital signature method such as that published by D.W. Davies ob cit to produce the authentication code. The code is combined with the transaction information record and in conjunction with the individual security key is sent to the encoding module 609. The module 609 now operating to encode, returns the transaction cipher text which is sent by conventional means to the issuing entity's files 608. In this manner a transaction may be executed and a digitally signed and encoded record of the transaction produced.

Figure 7:
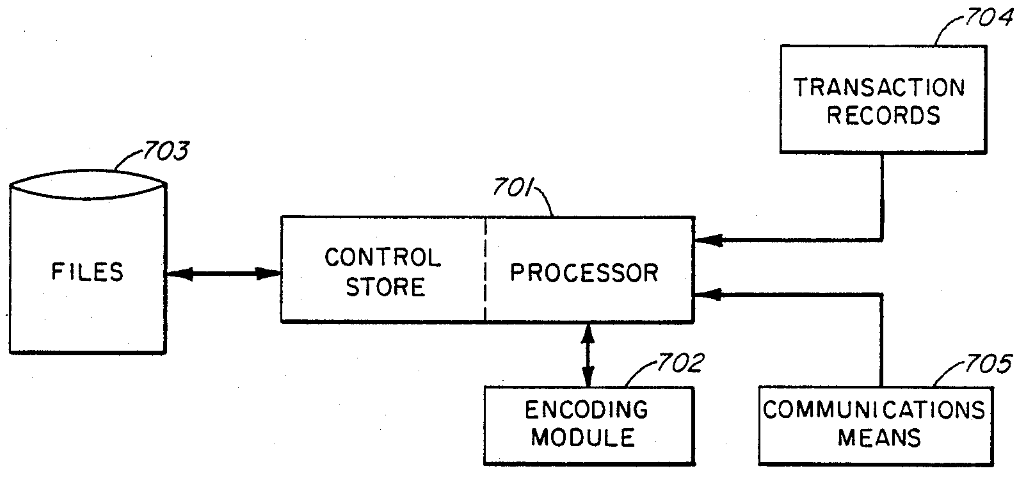
FIG. 7 is a block design of the transaction part apparatus in accordance with FIG. 3 and/or FIG. 4.

Referring now to FIG. 7 there is shown a block diagram of the transaction processing operation according to the transaction security method of FIG. 3 and/or the authentication code generation method of FIG. 4. At the time the transaction cipher text and associated data are received by the issuing entity via either digital data communications means 705 or any other means 704 for transporting such transaction records to said entity. The individual identification is extracted from the transaction record. The entity files 703 are referenced using any conventional means such as a disk controller or communications link and the individual security key associated with said individual identification is returned. The key and the transaction cipher text are sent to the encoding module 702 such as above described which operates in a decryption mode at this time. The encoding module 702 returns the transaction information record generated by the apparatus of FIG. 6. Elements of the transaction information record are combined with the individual security key, using the above described means, to reproduce the authentication code. If the reproduced authentication code is equivalent to the received authentication code the transaction information record is sent by the above described means to the entity files 703 for further processing. In this way the transaction records are decoded and verified before acceptance.

Many variations in implementation of the above apparatus, such as the distribution of various functions in space or time, the multiplication or reduction in the number of functional elements, or the substitution of differing means for the particular means described above, are clearly possible for anyone skilled in the art, however the above described apparatus is simply the best, most compact, and most general implementation known and is meant to encompass any such variation in implementation detail.

What is claimed is:

1. Apparatus for encoding a signal on an individual machine readable media when issued by an entity to a user for uniquely securing said media for use in performing transactions with said entity comprising:

entity public key cryptosystem key generating means (109) to produce a private key signal (110) and public key signal (206) pair;

user individual information input means (101) and checksum generating means (102) for providing specific user identity data and checksum verification data (105);

encoder means for encoding including a first encoding means (111) and a second encoding means (104), said first encoding means (111) is a public key cryptosystem and said second encoding means (104) is a private key cryptosystem;

said first encoding means (111) connected to said user individual input means (101) and checksum verification generating means (102) and said entity private key signal (110) for producing a first encoding signal (107);

said second encoding means (104) connected to said first encoding means (111) and checksum verification generating means (108) and user identification input means (100 and reduction means 103), for producing a media encoding signal (117);

said first encoding means (111) and said second encoding means (104) connected together to produce a signal at least twice encoded for use as said media encoding signal (117);

transducer means (114) connected to said second encoding means 104, said transducer means operable with the machine readable media (115) for recording a detectable signal thereon representative of at least said media encoding signal (117).

2. The apparatus according to claim 1, wherein said first encoding means and its corresponding input signals is a private key cryptosystem and said second encoding means and its corresponding input signals is a public key cryptosystem.

3. Apparatus for decoding a signal on an individual machine readable media when issued by a entity and used by a user for uniquely verifying said media for use in performing transactions with said entity comprising:

a media reader means (202) for reading said media encoding signal (200), decoder means for decoding including a first decoding means (212) and a second decoding means (205), said first decoding means (212) is a private key cryptosystem and said second decoding means (205) is a public key cryptosystem, said first decoding means (212) connected to said media reader input means (202) and checksum verification generating means (209) and user identification input means (210 and reduction generating means 211) for producing a first decoding signal (203), said second decoding means (205) connected to said first decoding means (212) and checksum verification generating means (214) and said entity public key signal (206) for producing individual information input (216), said first decoding means (212) and said second decoding means (205) connected together to produce a signal at least twice decoded for producing individual information input (216).

4. The apparatus according to claim 3 wherein the first decoding means and its corresponding input signals is a public key cryptosystem and said second decoding means and its corresponding input signals is a private key cryptosystem.

* * * * *